US011853412B2

(12) United States Patent
Fry et al.

(10) Patent No.: US 11,853,412 B2
(45) Date of Patent: Dec. 26, 2023

(54) SYSTEMS AND METHODS FOR DEFEATING STACK-BASED CYBER ATTACKS BY RANDOMIZING STACK FRAME SIZE

(71) Applicant: RUNSAFE SECURITY, INC., McLean, VA (US)

(72) Inventors: Shane Paulsen Fry, Madison, AL (US); David Nicholas Graham, Owens Cross Roads, AL (US)

(73) Assignee: RUNSAFE SECURITY, INC., McLean, VA (US)

( * ) Notice: Subject to any disclaimer, the term of this patent is extended or adjusted under 35 U.S.C. 154(b) by 42 days.

(21) Appl. No.: 17/268,580

(22) PCT Filed: Aug. 15, 2019

(86) PCT No.: PCT/US2019/046636
§ 371 (c)(1),
(2) Date: Feb. 15, 2021

(87) PCT Pub. No.: WO2020/037115
PCT Pub. Date: Feb. 20, 2020

(65) Prior Publication Data
US 2021/0200857 A1 Jul. 1, 2021

Related U.S. Application Data

(60) Provisional application No. 62/764,689, filed on Aug. 15, 2018.

(51) Int. Cl.
*G06F 21/52* (2013.01)

(52) U.S. Cl.
CPC ........ *G06F 21/52* (2013.01); *G06F 2221/033* (2013.01)

(58) Field of Classification Search
CPC .......................... G06F 21/52; G06F 2221/033
See application file for complete search history.

(56) References Cited

U.S. PATENT DOCUMENTS

| | | | | |
|---|---|---|---|---|
| 5,881,290 A | * | 3/1999 | Ansari | ...................... G06F 8/48 717/136 |
| 2015/0106872 A1 | * | 4/2015 | Hiser | ...................... H04L 63/14 726/1 |

(Continued)

FOREIGN PATENT DOCUMENTS

WO   WO 2016107802 A1   7/2016

*Primary Examiner* — Ashokkumar B Patel
*Assistant Examiner* — William B Jones
(74) *Attorney, Agent, or Firm* — Perkins Coie LLP

(57) ABSTRACT

Systems and methods of defending against stack-based cybersecurity attacks that exploit vulnerabilities in buffer overflows. The embodiments disclosed herein propose applying a randomized modification to the original size of the stack frames of functions of a program. By applying a randomized modification to the length of the stack frame, e.g., randomly increasing the length of the allocated stack frame memory, it becomes harder (if not impossible) for the attacker to guess or estimate the memory location where the return address of a function is stored, regardless of the attacker's knowledge of the length of the stack frame. Multiple implementations, e.g., randomizations at transform time, load time, and run time are discussed herein.

26 Claims, 8 Drawing Sheets

(56) References Cited

U.S. PATENT DOCUMENTS

2015/0317135 A1* 11/2015 Mun ................... G06F 8/35
717/140
2016/0357958 A1* 12/2016 Guidry ................ G06F 21/53

* cited by examiner

SYSTEMS AND METHODS FOR DEFEATING STACK-BASED CYBER ATTACKS BY RANDOMIZING STACK FRAME SIZE

CROSS-REFERENCE TO RELATED APPLICATION(S)

The present application is an International Application No. which claims priority to U.S. Provisional Patent Application No. 62/764,689 filed on Aug. 15, 2018 and is incorporated herein by reference in its entirety.

TECHNICAL FIELD

This disclosure is related to improved cybersecurity solutions. More particularly, embodiments disclosed herein are directed at a defense mechanism of applying a randomized modification of the stack frame size.

BACKGROUND

The ubiquitous use of electronic devices has led to an increased concern for security. In an age where software controls a significant portion of our daily lives, this concern is valid now more than ever. While there have been several attempts at building better tools and developing better processes to avoid introducing bugs in software that lead to vulnerabilities, attackers are coming up with newer ways to exploit vulnerabilities in software. One of the most prominent attack methods are stack-based attacks, which is a type of a return-oriented programming (ROP) attack. Stack-based attacks exploit vulnerabilities in software to hijack control flow by deviating from the intended control flow of the program and often times executing arbitrary code directed by the attacker to perform malicious computation. Traditional ways of addressing stack-based attacks generally involve significant degradation in performance or high complexities. Thus, there is an increased need for developing techniques of mitigating stack-based attacks.

DETAILED DESCRIPTION

Figure 1:
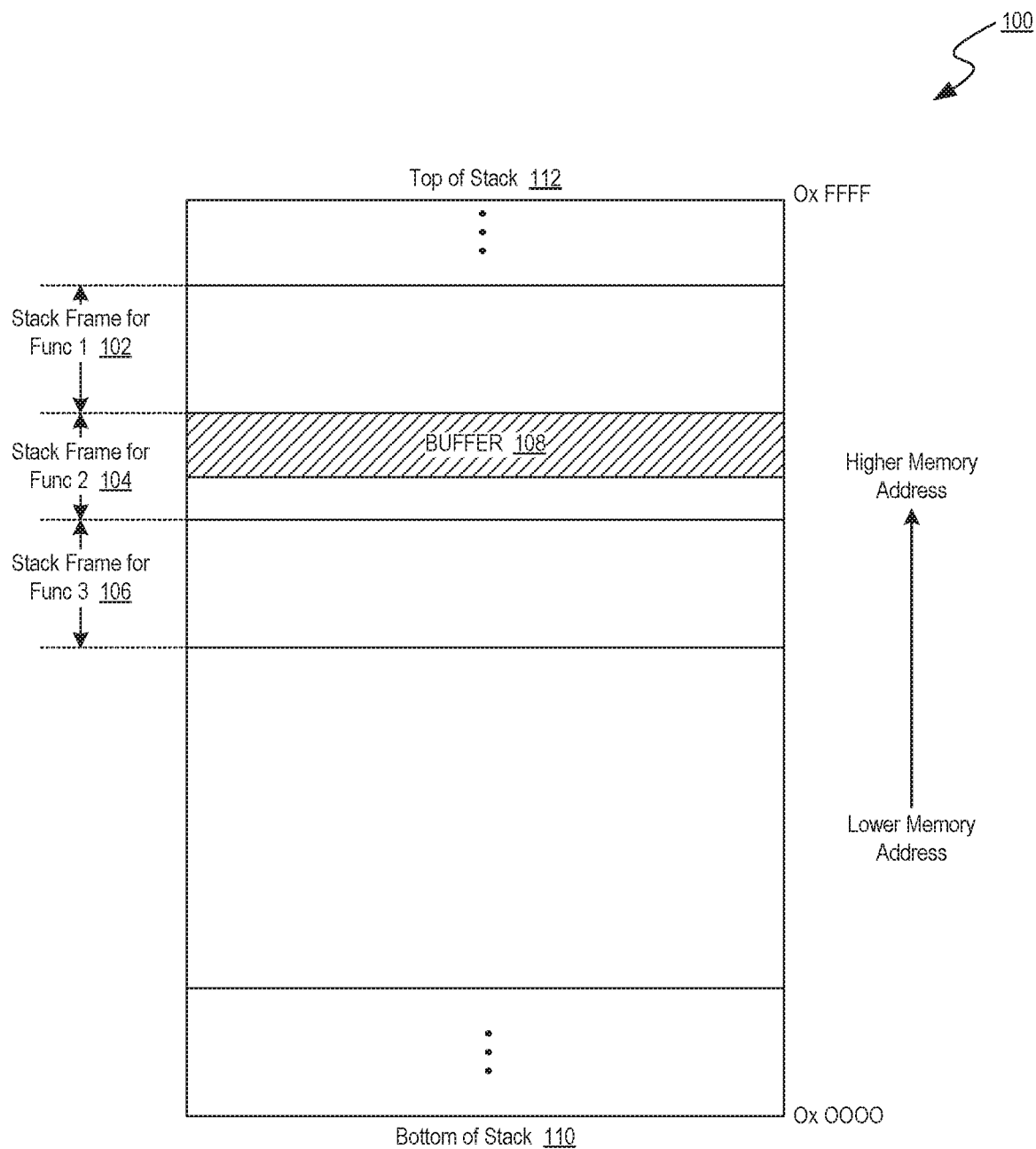
FIG. 1 shows a diagrammatic representation of a stack in computer memory.

This disclosure is directed at systems and methods of defending against stack-based cybersecurity attacks that exploit vulnerabilities in buffer overflows. One way of handling buffer overflows can be to make changes to the source code. In many scenarios, making changes to the source code may not be feasible. For example, a programmer might not have the source code at all, or does not have permission to make fixes to the source code. The present technology is directed at such scenarios. That is, one advantage of the disclosed technology is that vulnerabilities arising due to buffer overflows can be handled even in scenarios where the source code is unavailable or making changes to the source code is not possible. Embodiments disclosed herein are directed at making transforms or changes to a program binary without modifying the source code. Examples of a binary can be firmware, a program for running a web server, document viewer, a web browser, a mobile application, or any other program binary. The transformation of an original program binary (e.g., provided by manufacturers and suppliers) associated with an electronic system into a transformed binary (e.g., in accordance with methods disclosed herein) can be done before or after the electronic system is deployed for usage and does not require access to source code or an operating system. Furthermore, a transformed binary does not negatively impact or otherwise alter or the typical behavior of the electronic system.

The system and methods of the present disclosure can be applied across many different operating systems (e.g., Linux, UNIX, Windows) and in devices with no traditional operating system. For purposes of the discussions herein, the term "system" generally refers to any computing system including but not limited to smartphones, routers, wearable consumer devices, tablets, web servers, email servers, laptops, desktops, switches, data centers, server farms, industrial control systems, or generally any processor-controlled electronic device. In the descriptions herein, the terms "stack frame length," "length of stack frame," "size of stack frame," and "stack frame size" are used interchangeably. Also, the terms "randomized modification of stack frame" and "randomization of stack frame" have been used interchangeably.

The embodiments disclosed herein are directed at applying a randomized modification to the original size of the stack frames of functions of a program, rendering traditional stack-based buffer overflows non-viable, thereby prophylactically reducing the possibility of stack-based attacks. The success of a stack-based attack typically depends on the attacker's knowledge of the length of the stack frame. By applying a randomized modification to the length of the stack frame, e.g., randomly increasing the length of the allocated stack frame memory, it becomes harder (if not impossible) for the attacker to guess or estimate the memory location where the return address of a function is stored, regardless of the attacker's knowledge of the length of the stack frame. Consequently, a system employing the disclosed stack frame randomization has greater reliability and robustness against cyberattacks. In essence, the randomized modification increases the entropy of a system (e.g., the number of possible values of the length of the stack frame), making it difficult for the attacker to overwrite a buffer, regardless of whether or not the attacker has knowledge of the stack frame length. Various embodiments, advantages, and aspects of the disclosed technology will be apparent in the following discussions.

Figure 2A:
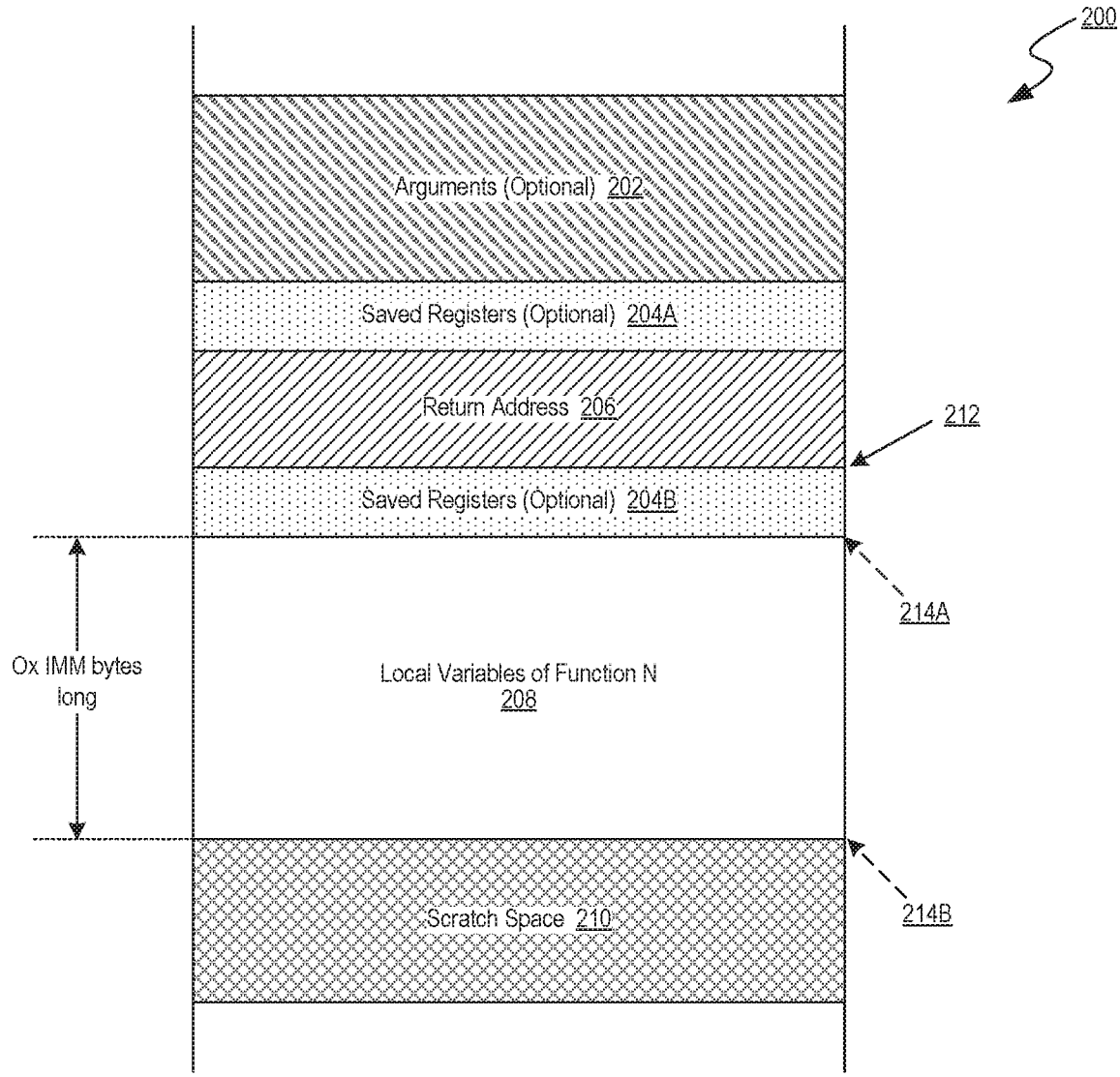
FIG. 2A shows a diagrammatic representation of a typical stack frame.

Referring now to the drawings, FIG. 1 shows a diagrammatic representation of a stack 100 in computer memory (alternately known as Random Access Memory or RAM). Stack 100 includes a top 112 and a bottom 110. When the program requires more memory, data/information is pushed at the bottom of the stack. Hence, as new data/information comes in, the newer data is "pushed below" the older ones. For example, stack 100 includes lower memory addresses (starting from 0x0000) at the bottom 110, and higher memory addresses (ending at 0xFFFF) at the top 112. Stack 100 includes stack frames for three example functions, denoted Func 1, Func 2, and Func 3. The hypothetical example in FIG. 2A illustrates a scenario where Func 1 calls Func 2 and Func 2 calls Func 3. Local variables of Func 1, Func 2, and Func 3 are stored in their respective stack frames. In FIG. 1, the stack frames for Func 1, Func 2, Func 3 are denoted 102, 104, and 106 respectively.

On many systems, the memory layout of a program, or the system as a whole, is well defined. By sending in data designed to cause a buffer overflow, it is possible to write into areas known to hold executable code and replace it with malicious code, or to selectively overwrite data pertaining to the program's state, therefore causing behavior that was not intended by the original programmer. Buffers are widespread in operating system (OS) code, so it is possible to make attacks that perform privilege escalation and gain unlimited access to the computer's resources. FIG. 1 shows buffer 108 included within stack frame 104. Buffer overflows are one of the most common exploits in software that result from buggy code which fails to perform the appropriate bounds checking. A buffer overflow is an anomaly where a program, while writing data to a buffer (e.g., buffer 108), overruns the buffer's boundary and overwrites adjacent memory locations. For example, in FIG. 1, a buffer overflow can cause the program to overwrite a portion of stack 102.

In a hypothetical example of buffer overflow, a hypothetical bug identified as Bug A can cause a buffer overflow in a hypothetical program called Program B. During its operation, let us suppose that program B allocates a fixed-size piece of memory to hold a font name and then copies the font name from a file into this piece of memory. Program B does not, however, check to ensure whether the font name will entirely fit in this piece of memory. In an event when Program B is provided with a really long font name, Program B overflows the buffer, corrupting its own memory, and an attacker can use this to execute arbitrary malicious code.

Attackers can exploit buffer overflows to manipulate the normal flow of the program to their advantage in several ways. In one instance, an attacker can overwrite a local variable that is located near the overflowing buffer on the stack, in order to change the behavior of the program. In another instance, an attacker can overwrite the return address in a stack frame. As a result, when the function returns, execution will resume at the return address as specified by the attacker. The return address can be a buffer associated with a user input which can be manipulated by the attacker for malicious intent. In yet another instance, an attacker can overwrite a function pointer or an exception handler, which is subsequently executed. Under ideal circumstances, incorporation of bounds checking can prevent buffer overflows, but it consumes additional storage (e.g., extra lines of code) and requires additional computation time. As a result, bounds checking may not be applicable in many scenarios or use cases. An advantage of the disclosed technology is that does not require bounds checking and is thus well suited for such scenarios.

It will be understood that the stack in FIG. 1 is for illustrative purposes only. Embodiments of the present technology impose no restrictions on the lengths, the data/information stored in the stack, and/or the number of stack frames that can be allocated on the stack.

FIG. 2A shows a diagrammatic representation of stack frame 200 prior to randomization of its stack length. Stack frame 200 includes memory allocated for: arguments 202; saved registers 204A, 204B; return address 206; local variables of an arbitrary Function N 208; and scratch space 210. The length of the stack frame is the amount (e.g., in number of bytes) of memory allocated to the local variables of Function N. This is denoted as the length 208 in FIG. 2A.

Registers are data storage locations directly on the CPU. With some exceptions, the size, or width, of a CPU's registers define its architecture. For example, in a 64-bit CPU, registers are 64 bits wide. The same is true of 32-bit CPUs (32-bit registers), 16-bit CPUs, and so on. Registers are very fast to access and are often the operands for arithmetic and logic operations. In FIG. 2A, data stored in registers can be saved optionally on the stack in regions 204A, 204B of the memory. A typical stack is an area of computer memory with a fixed origin and a variable size. Initially the size of the stack is zero. In FIG. 2A, the length of the stack frame is denoted as 0xIMM bytes long.

A prologue or preamble of a function includes instructions (e.g., a few lines of code at the beginning of the function) for setting up a stack frame, i.e., for making space on the stack for local variables of the function. Thus, a function prologue typically performs the following actions: pushes the current base pointer onto the stack so it can be restored later; assigns the value of stack pointer (which is pointed to the saved base pointer) to the base pointer so that a new stack frame can be created on top of the old stack frame; and moves the stack pointer further by decreasing (or increasing) its value as the stack grows down (or up).

In the INTEL x86 processors, special registers are used to store the value of the stack pointer and frame pointer. For example, special registers rbp and rsp are used wherein rbp is the base pointer (also known as frame pointer), which points to the base of the current stack frame, and rsp is the stack pointer, which points to the bottom of the current stack frame. rbp has a higher value than rsp because the stack starts at a high memory address and grows downwards. On the INTEL x86 processors, a function prologue can include the sub rsp, 0xIMM instruction, where IMM denote how many bytes of space to allocate on the stack for storing local variables of a function. Thus, a hypothetical instruction sub rsp, 0x9 allocates 9 bytes of memory on the stack.

The stack pointer, usually in the form of a hardware register, points to the most recently referenced location on the stack. When the stack has a size of zero, the stack pointer points to the origin of the stack. In FIG. 2A, the location of the stack pointer is denoted 214A at the start of the prologue and at location 214B at the end of the prologue. FIG. 2A also shows a frame pointer pointing to location 212 in the memory. At function return, the stack pointer is restored to the frame pointer, i.e., the value of the stack pointer just before the function was called.

An attacker that knows the stack frame size for a given function can use that information to craft reliable buffer overflow exploits in one or more functions having a buffer overflow vulnerability. The disclosed stack frame modification mitigates this by adding a randomly-generated value 0x N to the 0x IMM value used to create the stack frame. For example, given one instance of a program binary, the stack size of each function in the program binary can be subjected to the same random increase of N bytes. In some embodiments, given one instance of a program binary, the stack size of each function in the program binary can be subjected to a different random increase of N bytes. Consequently, the length of the stack frame for every function in a program increases by the same amount. Hence, when an attacker attempts to exploit the vulnerability, they are unable to successfully overwrite the return address, making their attack unsuccessful.

A function epilogue appears at the end of the function, and restores the stack and registers to the state they were at, before the function was called. In essence, the epilogue reverses the actions of the function prologue and returns control to the calling function. An epilogue typically does the following actions: drop the stack pointer to the current base pointer so room reserved in the prologue for local variables is freed; pops the base pointer off the stack so it is restored to its value before the prologue; and returns to the calling function by popping the previous frame's program counter off the stack and jumping to it.

When the function exits, the allocated memory (e.g., 9 bytes in the above example) is returned to the stack resulting in cleanup of the stack frame. On the INTEL x86 processors, a function epilogue can include the add rsp, 0xIMM instruction. For example, to return 9 bytes of memory, the instruction can be add rsp, 0x9. After exiting a function, the program returns control back to the memory address specified in the return address register (e.g., the address 206 in FIG. 2A). In accordance with the disclosed technology, a function epilogue can include the add rsp, 0x (IMM+N) instruction for cleanup of the stack frame.

Figure 2B:
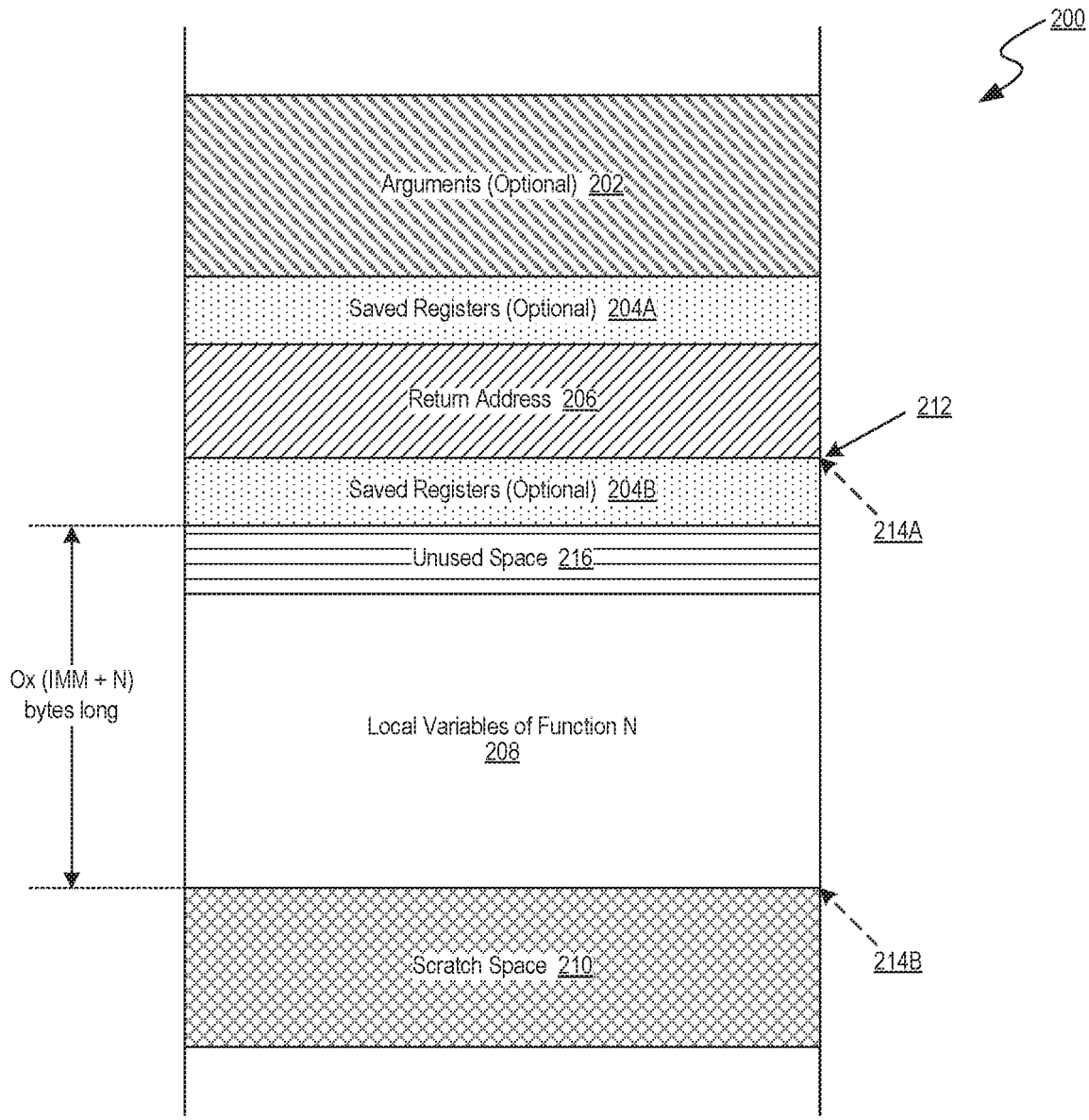
FIG. 2B shows a diagrammatic representation of the stack frame in FIG. 2A after applying a randomized modification of the stack frame size, according to some embodiments of the disclosed technology.

FIG. 2B shows a diagrammatic representation of the stack frame 200 in FIG. 2A after applying modification to the original length of the stack frame. The length of the stack frame in FIG. 2B is denoted 0x (IMM+N) bytes, where N is a randomly-generated number. In some embodiments, the modification can be applied by passing a program binary (e.g., firmware or a program) through another program, which causes the randomized offset. Because the original program binary is "transformed" when it is passed through the other program, this type of modification is referred to as being performed at "transform time." The transform time is a lifecycle phase of a program binary that occurs after compilation but before the program binary is loaded into memory.

When employing modification at transform time, on the INTEL x86 processors for example, the stack setup instructions (in the prologue) and stack cleanup instructions (in the epilogue) are sub rsp, 0x (IMM +N) and add rsp, 0x (IMM+N) respectively. In some implementations, the stack size of each function in a program binary can be subjected to the same fixed modification (e.g., randomly-generated increase) of N bytes. Because the randomized modification occurs at or during transform time of a single instance of a program binary, this value of N does not change with multiple calls to a given function or multiple runs of this instance of the program binary. Further, no two instances of program binaries are associated with the same randomly-generated N. Although a program binary can include multiple functions, because no two binaries have the value N, the disclosed technique improves the functioning of a computer itself, by mitigating the chances of stack-based attacks at scale, when many instances (e.g., hundreds, thousands, or an arbitrarily large number) of programs binary are deployed.

In scenarios where higher reliability is desirable, the randomized modification of the stack size can occur at other times besides transform time. In these implementations, only one instance of transformed program binary is created, eliminating the need for generating multiple transformed instances of the program binary.

The randomization of the stack length can occur at different lifecycle phases. In a first implementation, the randomization occurs when the program is loaded for the first time in memory. In a second implementation, the randomization occurs at runtime during execution of the program binary. Both implementations are discussed herein. In what follows next, details of randomization at load time and randomization at execution time will be discussed in greater detail.

Figure 3:
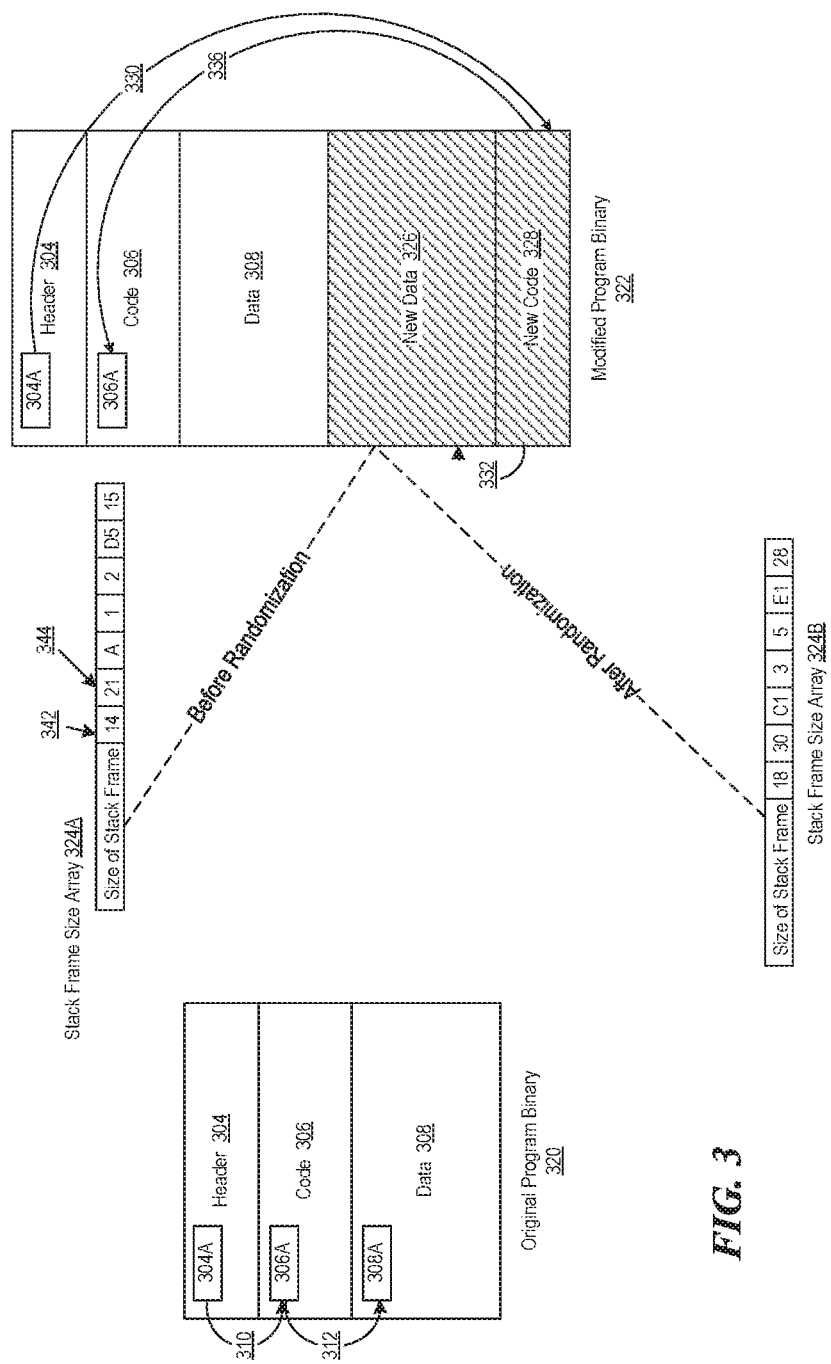
FIG. 3 shows a block diagram associated with applying a randomized modification of the stack frame size when the program binary is loaded into the memory, according to some embodiments of the disclosed technology.

FIG. 3 shows a block diagram associated with randomization of the stack frame size when the program binary is loaded into the memory (a/k/a load time randomization), according to some embodiments of the disclosed technology. FIG. 3A shows original program binary 320 including header 304, code 306, and data 308. FIG. 3A also shows an example of a program flow of original program binary. Starting from entry point 304A within header 304, program flow 310 jumps to code point 306A which references (e.g., via program flow 312) data section 308A in data 308. Thus, it can be understood and appreciated that program flow does not necessarily follow the manner in which the program binary is arranged (e.g., shown in FIG. 3 as non-overlapping sections for header 304, code 306, and data 308).

Randomization of the stack frame size when the program binary is loaded into memory causes modification of the original program binary. For example, original program binary 320 is changed into modified program binary 322 by adding new data section 326 and new code section 328. Modified program binary includes the same sections as original binary 322, header 304, code 306, data 308, in addition to newly inserted data section 326 and newly inserted code section 328. These sections were not present in original program binary 320 and are added for randomizing the stack frame size at load time. New code 328 references new data section 326 which stores a data structure termed herein as the stack frame size array. The stack frame size array may store integers, floating point numbers, vectors, or any other data structure associated with the representation of the random offset N. For example, in a use case where a function is a recursive function, a stack data structure or a vector data structure may be used to store multiple different random offsets for the function. FIG. 3 demonstrates an example of stack frame size array 324A before randomization and an example of stack frame size array 324B after randomization. In the example stack frame size array 324A, the stack frame size of the first function is 14 (denoted 342 in FIG. 3), the stack frame size of the second function is 21 (denoted 344 in FIG. 3), and so on. Further, it can be seen from stack frame size array 324A, 324B, that the elements of stack frame size array 324A are overwritten by adding a randomly generated offset to the initial elements of stack frame size array 324A. Because the stack length randomization is performed at load time, the value of the randomly generated offset is different for each element of the array. Thus, each function is associated with a different random offset. New code section 328 hijacks or redirects program flow (denoted 330) from entry point 304A in header 304 of modified program binary 322. Subsequently, new code section 328 references (e.g., denoted as program flow 332) new data section 326 and reverts back to code point 306A in code section 306.

Figure 4:
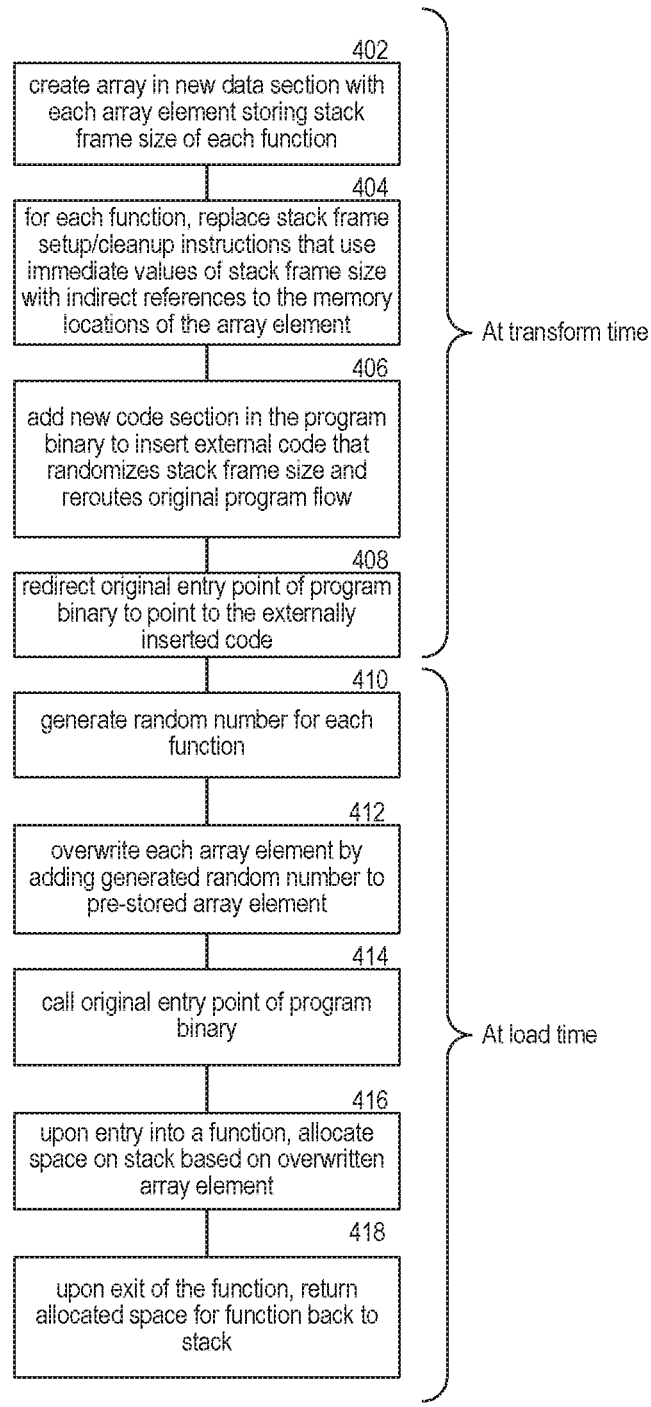
FIG. 4 shows a flowchart of steps associated with applying a randomized modification of the stack frame size when the program binary is loaded into the memory, according to some embodiments of the disclosed technology.

FIG. 4 shows a flowchart of a process associated with randomization of the stack frame size when the program binary is loaded into the memory, according to some embodiments of the disclosed technology. According to these embodiments, given one instance of a transformed binary, every function of the instance is subjected to a different randomly-generated offset N. Further, given a function of the instance, this value of N typically does not change with multiple calls to this function. However, for a given function of the instance, multiple runs of the instance are likely to result in different N for each run. Steps 402, 404, 406, 408 of the process can be performed at transform time and steps 410, 412, 414, 416, 418 are performed by external code (e.g., new code section 326 in FIG. 3) at load time. At step 402, the process creates a stack frame size array in a new data section with each element of the array storing a frame size for each function in the program binary. Thus, generally, the size of the array corresponds to the total number of functions in the program binary. At step 404, the process replaces (e.g., for each function in the program binary) stack frame setup and stack frame cleanup instructions that use immediate value of the stack frame size with indirect references to the memory locations of the array elements. For example, an instruction such as sub rsp, 0xIMM instruction, where IMM denotes how many bytes of space to allocate on the stack for storing local variables of a function is replaced by a sub rsp, [rs_data+0x40] instruction, in which the rs_data denotes the memory location corresponding to the address of the array and 0x40 is an example memory offset of an array element in the stack frame size array with respect to the beginning of the array. At step 406, the process adds a new code section (e.g., new code section 326 in FIG. 3) in the program. The new code section includes code that randomizes the sizes of stack frames. At step 408, the process redirects the original entry point of the program binary to point to the new code section. The process generates (at step 410) random numbers for each function in the program binary. In some examples, the seed of the random number generator can be set by a user, if desired. At step 412, the process overwrites each array element by adding the generated random number with the pre-stored array element. The process calls (at step 414) the original entry point of the program binary. As a result, the process then follows the original flow of the program binary. Upon entry into a function, the process allocates (at step 416) space on the stack for storing local variables of the function. The allocated space corresponds to the value of the overwritten array element associated with the function. Upon exit from a function (at step 418), the process returns the allocated space back to the stack. The process enters steps 416 and 418 every time a function is called.

Figure 5A:
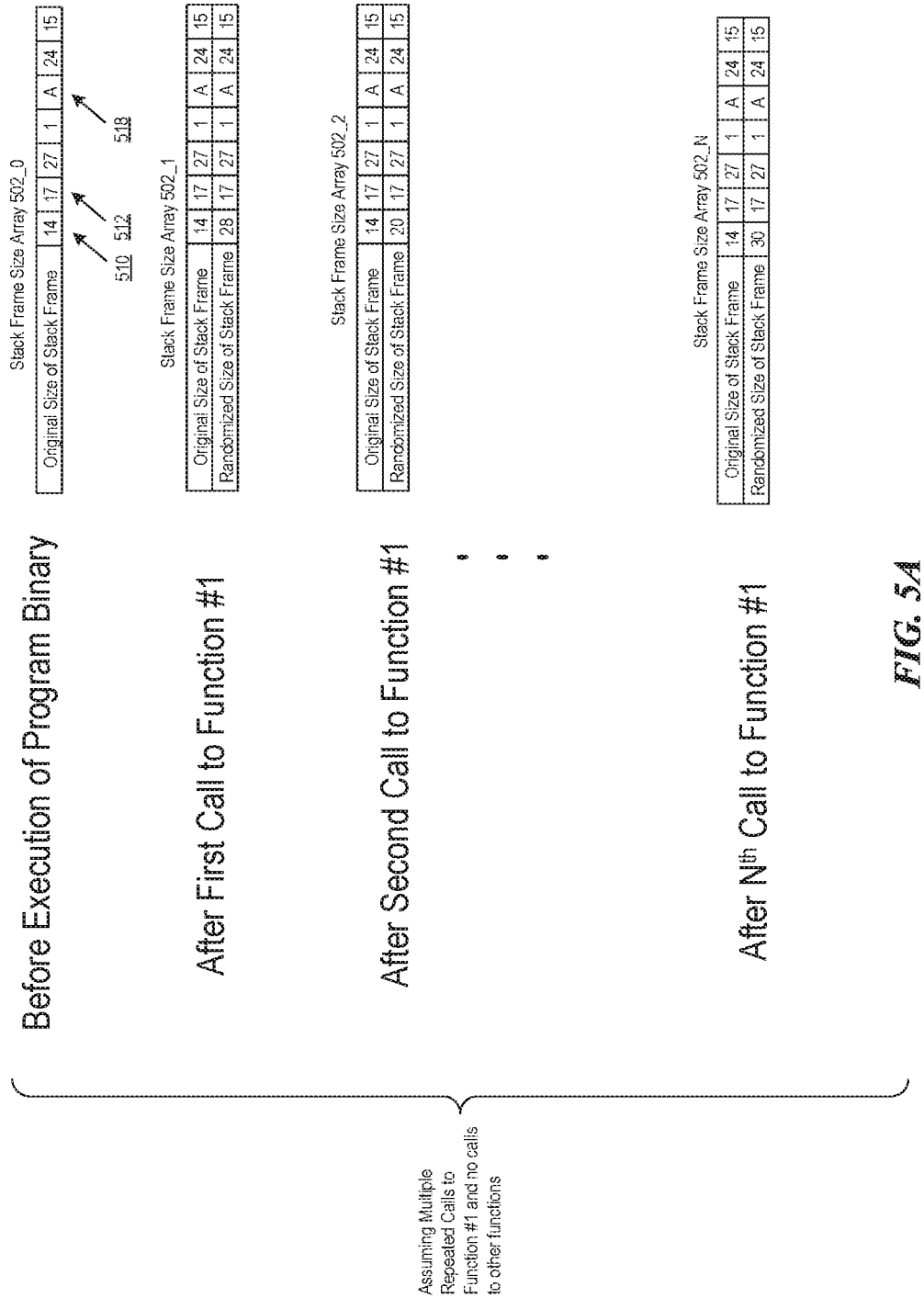
FIG. 5A shows one set of snapshots of a sample array associated with applying runtime randomizations of the stack frame size when the program binary is executed, according to some embodiments of the disclosed technology.

FIG. 5A shows one set of snapshots of sample arrays associated with applying runtime randomizations of the stack frame size when the program binary is executed, according to some embodiments of the disclosed technology. According to these embodiments, every function of the instance is subjected to a different (randomly-generated) offset N. For a given function, multiple calls to this function are likely to result in different N. Further, given a function of the instance, multiple runs of the program will lead to different N. FIG. 5A demonstrates a scenario in which multiple repeated calls (e.g., P calls) are made to Function #1 and no calls are made to other functions. The original size of the stack frames are 14 (denoted 510), 17 (denoted 512), . . . . A (denoted 518) for functions arbitrarily referred to as Function #1, Function #2, . . . Stack frame array 502_0 illustrates a sample stack frame array before execution of program binary. Stack frame array 502_1 illustrates that stack frame array 502_0 is augmented and the randomized stack frame size of Function #1 is 28, after a first call to Function #1. That is, the value of the randomized stack frame size is greater than the original stack frame size. Stack frame array 502_1 also illustrates that the remaining array elements of stack frame array 502_1 have not been randomized because FIG. 5A corresponds to a scenario in which multiple repeated calls are made to Function #1 and no calls are made to other functions. That is, the randomized stack frame length is the same as the original stack frame length, for functions other than Function #1. Stack frame size array 502_2 illustrates the stack frame size of Function #1 changing from 28 (after the first call to Function #1) to 20 (after the second call to Function #1).

Figure 5B:
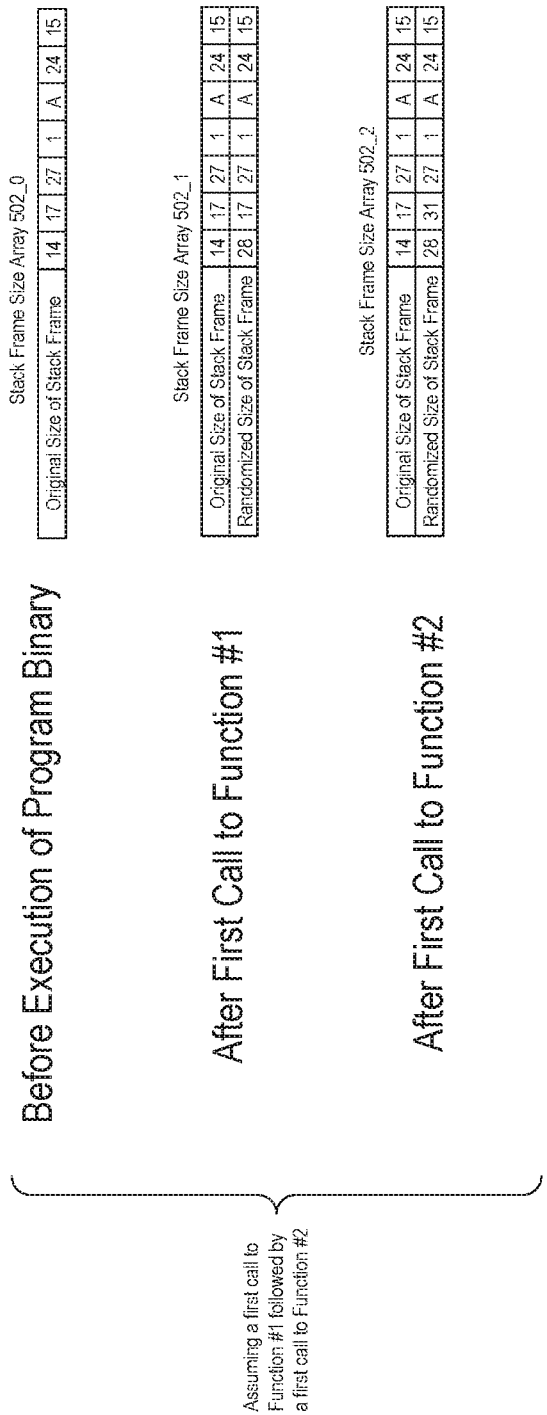
FIG. 5B shows another set of snapshots of a sample array associated with applying runtime randomizations of the stack frame size when the program binary is executed, according to some embodiments of the disclosed technology.

FIG. 5B shows another set of snapshots of sample arrays associated with applying runtime randomizations of the stack frame size when the program binary is executed, according to some embodiments of the disclosed technology. FIG. 5B demonstrates a scenario in which a first call is made to Function #1 followed by a first call to Function #2. Stack frame size array 502_0 is a sample stack frame size array before execution of program binary. Stack frame size array 502_1 and stack frame size array 502_2 illustrate exemplarily how stack frame size array 502_0 changes after a first call to Function #1 followed by a first call to Function #2. For example, FIG. 5B shows that after the first call to Function #1, the randomized stack frame size for Function #1 increases from 14 to 28. However, the stack frame sizes of the other functions, including Function #2 stays the same. But, after the first call to Function #2, the randomized stack frame size of Function #2 increases is 31, whereas the randomized stack frame size of Function #1 does not change (e.g., stays at 28).

Figure 6:
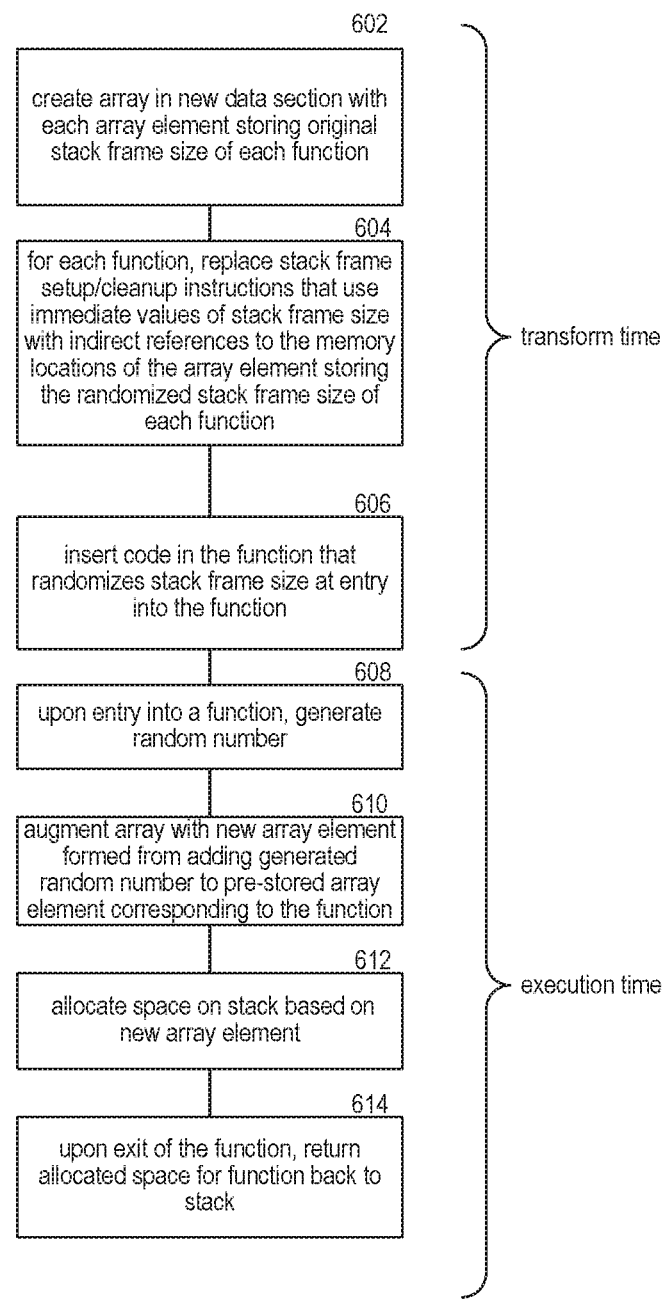
FIG. 6 shows a flowchart of steps associated with applying a randomized modification of the stack frame size when the program binary is executed from the memory, according to some embodiments of the disclosed technology.

FIG. 6 shows a flowchart of steps of a process associated with randomization of the stack frame size when the program binary is executed from the memory, according to some embodiments of the disclosed technology. Steps 602, 604, 606 of this flowchart can be performed at transform time and steps 608, 610, 612, 614 are performed by code (e.g., into each function of the program binary) at run time. At step 602, the process creates a stack frame size array in a new data section, with each array element storing the original stack frame size associated with each function. At step 604, the process replaces (e.g., for each function in the program binary) stack frame setup and stack frame cleanup instructions that use immediate value of the stack frame size with indirect references to the memory locations of the array elements. For example, an instruction such as sub rsp, 0xIMM instruction, where IMM denotes how many bytes of space to allocate on the stack for storing local variables of a function is replaced by a sub rsp, [rs_data+0x40] instruction, in which the rs_data denotes the memory location corresponding to the address of the array and 0x40 is an example memory offset of an array element in the stack frame size array with respect to the beginning of the array. At step 606, the process inserts code into each function in the program binary. The new code section includes code that randomizes the sizes of stack frames at the entry point of a function. At step 608, upon entering a function, the process generates a random number. In some examples, the seed of the random number generator can be set by a user, if desired. At step 610, the process augments the stack frame size array with a new array element formed from adding the random number to the pre-stored array element (i.e., original stack frame size) associated with the function. As a result of adding the random number offset to the size of the stack space originally requested by the program binary, a randomized stack size is generated. The process allocates (at step 612) space on the stack for storing local variables of the function. The allocated space corresponds to the value of the randomized stack frame size associated with the function, e.g., upon entry of the program flow into a function. Upon exit from a function (at step 614), the process returns the allocated space back to the stack. Every time a function is called, the process starts art step 608.

In some scenarios (e.g., based on the function prologues and function epilogues of a program binary), randomization of a stack length may not be necessary or otherwise may be undesirable. Examples of such scenarios can arise when a function prologue exists without an epilogue, or vice-versa.

The systems and methods of the present disclosure include the ability to modify the length of a stack by applying a randomly generated offset to the original stack length requested by a program binary. The randomly generated offset (or, generally randomization of the stack length) can be applied at transform time, load time or run time, depending on the computing resources available, constraints (if any), and/or choices of system managers. Randomly modifying the stack length makes stack based buffer overflows non-viable, thereby making the attacker's job harder to launch attacks at scale.

Some embodiments of the disclosed technology are presented in clause-based format.

1. A method of defending against stack-based cybersecurity attacks that exploit vulnerabilities in buffer overflows of a stack register included as part of a random access memory (RAM) configured for storing local variables of a function included in a program binary comprising:
generating a random number offset;
determining a size of the stack space originally requested by the program binary;
generating a randomized stack size by adding the random number offset to the size of the stack space originally requested by the program binary;
replacing one or more instructions including the size of the stack space with the randomized stack size;
upon entry of program flow into the function, allocating stack space on the stack register in accordance with the randomized stack size; and
upon exit of program flow into the function, de-allocating the allocated stack space.

2. The method of clause 1, wherein the one or more instructions are setup instructions associated with creating the stack space for the function.

3. The method of clause 1, wherein the one or more instructions are cleanup instructions associated with returning the allocated stack space for the functions back to the stack.

4. The method of clause 2, wherein the setup instructions are included in a prologue of the function.

5. The method of clause 3, wherein the cleanup instructions are included in an epilogue of the function.

6. The method of clause 1, wherein the program binary is standalone code devoid of the source code.

7. A non-transitory computer-readable storage medium having stored thereon instructions for defending against stack-based cybersecurity attacks that exploit vulnerabilities in buffer overflows of a stack register included as part of a random access memory (RAM) configured for storing local variables of a function included in a program binary, wherein the instructions when executed by a processor of an electronic device cause the processor to:
generate random number offset;
determine a size of the stack space originally requested by the program binary;
generate a randomized stack size by adding the random number offset to the size of the stack space originally requested by the program binary;
replace one or more instructions including the size of the stack space with the randomized stack size;
upon entry of program flow into the function, allocate stack space on the stack register in accordance with the randomized stack size; and
upon exit of program flow into the function, de-allocate the allocated stack space.

8. The non-transitory computer-readable storage medium of clause 7, wherein the one or more instructions are setup instructions associated with creating the stack space for the function.

9. The non-transitory computer-readable storage medium of clause 7, wherein the one or more instructions are cleanup instructions associated with returning the allocated stack space for the functions back to the stack.

10. The non-transitory computer-readable storage medium of clause 8, wherein the setup instructions are included in a prologue of the function.

11. The non-transitory computer-readable storage medium of clause 9, wherein the cleanup instructions are included in an epilogue of the function.

12. The non-transitory computer-readable storage medium of clause 7, wherein the program binary is stand-alone code devoid of the source code.

13. An apparatus for defending against stack-based cybersecurity attacks that exploit vulnerabilities in buffer overflows comprising:
at least one random access memory (RAM) storing a stack register configured for storing local variables of a function included in a program binary; and
at least one processor coupled to the at least one RAM, the at least one processor configured for:
generating a random number offset;
determining a size of the stack space originally requested by the program binary;
generating a randomized stack size by adding the random number offset to the size of the stack space originally requested by the program binary;
replacing one or more instructions including the size of the stack space with the randomized stack size;
upon entry of program flow into the function, allocating stack space on the stack register in accordance with the randomized stack size; and
upon exit of program flow into the function, de-allocating the allocated stack space.

14. The apparatus of clause 13, wherein the one or more instructions are setup instructions associated with creating the stack space for the function.

15. The apparatus of clause 13, wherein the one or more instructions are cleanup instructions associated with returning the allocated stack space for the functions back to the stack.

16. The apparatus of clause 14, wherein the setup instructions are included in a prologue of the function.

17. The apparatus of clause 15, wherein the cleanup instructions are included in an epilogue of the function.

18. The apparatus of clause 13, wherein the program binary is standalone code devoid of the source code.

19. The apparatus of clause 13, wherein the random number offset is produced by a random number generator.

20. The apparatus of clause 19, wherein a seed of the random number generator is a user-specified value.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present disclosure is not intended to be limited to the embodiments shown or described herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

We claim:

1. A method of defending against stack-based cybersecurity attacks that exploit vulnerabilities in buffer overflows of a stack register included as part of a random access memory (RAM) configured for storing local variables of a function included in a program binary comprising:
   prior to loading of the program binary into the RAM and after compilation, transforming the program binary to include modifications that relate to stack frame size;
   generating a random number offset;
   determining a size of a stack space originally requested by the program binary;
   generating a randomized stack size by adding the random number offset to the size of the stack space originally requested by the program binary;
   replacing one or more instructions including the size of the stack space with the randomized stack size;
   upon entry of program flow into the function, allocating stack space on the stack register in accordance with the randomized stack size; and
   upon exit of program flow from the function, de-allocating the allocated stack space.

2. The method of claim 1, wherein the one or more instructions are setup instructions associated with creating the stack space for the function.

3. The method of claim 2, wherein the setup instructions are included in a prologue of the function.

4. The method of claim 1, wherein the one or more instructions are cleanup instructions associated with returning the allocated stack space for the functions back to the stack.

5. The method of claim 4, wherein the cleanup instructions are included in an epilogue of the function.

6. The method of claim 1, wherein the program binary is standalone code devoid of the source code.

7. The method of claim 1, wherein the modifications that relate to the stack frame size correspond to a fixed change in the stack frame size.

8. The method of claim 1, wherein the modifications that relate to the stack frame size correspond to creation of an array element storing a stack frame size of the function, replacement of immediate values of the stack frame size with indirect references to the stack frame size, and addition of a code section that relates to randomizing the stack frame size.

9. A non-transitory computer-readable storage medium having stored thereon instructions for defending against stack-based cybersecurity attacks that exploit vulnerabilities in buffer overflows of a stack register included as part of a random access memory (RAM) configured for storing local variables of a function included in a program binary, wherein the instructions when executed by a processor of an electronic device cause the processor to:
   generate random number offset;
   determine a size of a stack space originally requested by the program binary;
   generate a randomized stack size by adding the random number offset to the size of the stack space originally requested by the program binary;

replace one or more instructions including the size of the stack space with the randomized stack size;

upon entry of program flow into the function, allocate stack space on the stack register in accordance with the randomized stack size; and upon exit of program flow from the function, de-allocate the allocated stack space, wherein, after compilation and prior to loading into the RAM, the program binary has been transformed to include modifications that relate to stack frame size.

10. The non-transitory computer-readable storage medium of claim 9, wherein the one or more instructions are setup instructions associated with creating the stack space for the function.

11. The non-transitory computer-readable storage medium of claim 10, wherein the setup instructions are included in a prologue of the function.

12. The non-transitory computer-readable storage medium of claim 9, wherein the one or more instructions are cleanup instructions associated with returning the allocated stack space for the functions back to the stack.

13. The non-transitory computer-readable storage medium of claim 12, wherein the cleanup instructions are included in an epilogue of the function.

14. The non-transitory computer-readable storage medium of claim 9, wherein the program binary is standalone code devoid of the source code.

15. The non-transitory computer-readable storage medium of claim 9, wherein the modifications that relate to the stack frame size correspond to a fixed change in the stack frame size.

16. The non-transitory computer-readable storage medium of claim 9, wherein the modifications that relate to the stack frame size correspond to creation of an array element storing a stack frame size of the function, replacement of immediate values of the stack frame size with indirect references to the stack frame size, and addition of a code section that relates to randomizing the stack frame size.

17. An apparatus for defending against stack-based cyber-security attacks that exploit vulnerabilities in buffer overflows comprising:

at least one random access memory (RAM) storing a stack register configured for storing local variables of a function included in a program binary; and at least one processor coupled to the at least one RAM, the at least one processor configured for:

prior to loading of the program binary into the RAM and after compilation, transforming the program binary to include modifications that relate to stack frame size; and generating a random number offset;

determining a size of a stack space originally requested by the program binary;

generating a randomized stack size by adding the random number offset to the size of the stack space originally requested by the program binary;

replacing one or more instructions including the size of the stack space with the randomized stack size;

upon entry of program flow into the function, allocating stack space on the stack register in accordance with the randomized stack size; and upon exit of program flow from the function, de-allocating the allocated stack space.

18. The apparatus of claim 17, wherein the one or more instructions are setup instructions associated with creating the stack space for the function.

19. The apparatus of claim 18, wherein the setup instructions are included in a prologue of the function.

20. The apparatus of claim 17, wherein the one or more instructions are cleanup instructions associated with returning the allocated stack space for the functions back to the stack.

21. The apparatus of claim 20, wherein the cleanup instructions are included in an epilogue of the function.

22. The apparatus of claim 17, wherein the program binary is standalone code devoid of the source code.

23. The apparatus of claim 17, wherein the random number offset is produced by a random number generator.

24. The apparatus of claim 23, wherein a seed of the random number generator is a user-specified value.

25. The apparatus of claim 17, wherein the modifications that relate to the stack frame size correspond to a fixed change in the stack frame size.

26. The apparatus of claim 17, wherein the modifications that relate to the stack frame size correspond to creation of an array element storing a stack frame size of the function, replacement of immediate values of the stack frame size with indirect references to the stack frame size, and addition of a code section that relates to randomizing the stack frame size.

* * * * *